United States Patent [19]

Palmieri

[11] 4,276,925
[45] Jul. 7, 1981

[54] ELECTRONIC TEMPERATURE CONTROL SYSTEM

[75] Inventor: Joseph M. Palmieri, Deep River, Conn.

[73] Assignee: Fuel Computer Corporation of America, New Haven, Conn.

[21] Appl. No.: 77,105

[22] Filed: Sep. 19, 1979

[51] Int. Cl.³ .............................................. F25B 29/00
[52] U.S. Cl. .................................. 165/12; 236/46 R; 364/505
[58] Field of Search ....................... 165/12; 236/46 R

[56] References Cited

U.S. PATENT DOCUMENTS

| | | | |
|---|---|---|---|
| 3,724,534 | 4/1973 | Weatherston | 165/12 |
| 3,942,718 | 3/1976 | Palmieri | 236/78 R |
| 4,071,745 | 1/1978 | Hall | 236/46 R X |
| 4,141,407 | 2/1979 | Briscoe et al. | 165/12 |
| 4,213,562 | 7/1980 | Garrett et al. | 236/46 R |
| 4,215,408 | 7/1980 | Games et al. | 236/46 R X |

*Primary Examiner*—Albert W. Davis

*Attorney, Agent, or Firm*—McAulay, Fields, Fisher, Goldstein & Nissen

[57] ABSTRACT

A digital computerized temperature control system maintains ambient temperatures at preselected levels respectively at a plurality of remote locations, each of which may be provided with a digitally operated electronic thermostat of the type described in U.S. Pat. No. 3,942,718. The system includes a real time clock, a keyboard data-entry unit, serial data controllers for sequentially polling each of the thermostats and producing polled temperature data, including a first memory for storing the data corresponding to the desired temperature limits for each thermostat location and a second memory for storing the polled temperature data. A comparator compares the polled temperature data with the desired ambient temperature limit data and accordingly produces overlimit, underlimit and equal limit counts which are stored in another memory. A central processor unit selectively produces heating, cooling, and no-operation signals in accordance with the overlimit, underlimit and equal limit counts.

15 Claims, 2 Drawing Figures

ELECTRONIC TEMPERATURE CONTROL SYSTEM

BACKGROUND OF THE INVENTION

The present invention relates to temperature controls and more particularly to a digital computerized environmental temperture control system.

It is widely recognized that substantial energy unnecessarily is wasted in buildings having many occupancy units, such as apartment houses, large office buildings, hotels, and the like, in which each occupancy unit includes at least one thermostat for controlling the ambient temperature either by heating or cooling. Such losses occur through a variety of reasons, some of which are attributable to human carelessness, and others due, for example, to the orientation of the building with respect to the sun, and seasonal and daily cyclical variations in environmental temperature. Thus, by way of example, on a sunny day those occupancy units on one side of a building facing the sun will be warmer due to increased solar radiation and, accordingly, will require either less heat in the winter time or more cooling in the summer time, as the case may be, than the other units on the shady side of the building.

In another example, on holidays office buildings require less heating or cooling, as the case may be, than on regular workdays, and will require more heating or cooling during daily peak periods than otherwise. Further adjustments may have to be made for shifts in the peak demand periods when, for example, Daylight Saving Time is instituted.

In addition, through individual carelessness, thermostats may be left at unduly high or low settings after the office has been vacated for the day, or a room window may be left open, thus calling for unnecessary heating or cooling.

Avoidable waste of fuel, in such cases as those described above, has become a source of great concern particularly since the advent of critical shortages in fuel and the spiraling cost of almost all sources of energy. A long felt need has, therefore, existed for an energy-efficient, computerized temperature control system which will eliminate unnecessary heat waste caused by the above-described factors, as well as many others too numerous to specifically detail herein.

The thermostat most commonly used in the past in the above-described, multi-unit applications, as well as in the home, is the electromechanical type having a bimetallic strip which curls and straightens to open and close a mercury switch.

Recently, however, improved electronic thermostats have become available, which, in addition to providing greater accuracy and reliability as compared with the electro-mechanical type, are particularly suitable for control by computer. A particularly advantageous electronic thermostat of this class is exemplified by the digitally controlled electronic thermostat described in U.S. Pat. No. 3,942,718.

It is accordingly, an object of the present invention to provide an electronic temperature control system.

Another object of the present invention is to provide a computer-controlled temperature control system for monitoring and controlling temperatures at multiple remote locations.

It is a further object of the present invention to provide a digital computerized temperature control system of the character described which is adaptable for use with multiple, digitally-operated electronic thermostats espectively situated at multiple remote locations.

It is yet another object of the present invention to provide a digital computerized temperature control system of the character described which substantially reduces waste of fuel, which otherwise results from improperly set thermostats.

SUMMARY OF THE INVENTION

In accordance with the principles of the present invention, there is provided a temperature information and control system for maintaining ambient temperatures at preselected levels respectively at a plurality of locations, each of which is provided with a digitally operated electronic thermostat. Said system comprises a real time clock, data entry means, means for polling each of said thermostats to determine the temperature at each said location at a particular time and to produce polled temperature data, first memory storage means for storing digital data corresponding to the desired ambient temperature limits for each said location and second memory storage means for storing said polled temperature data. There is further provided comparator means for comparing said polled temperature data with said desired ambient temperature limit data and producing overlimit, underlimit and equal limit counts. Third memory storage means are provided for storing said overlimit, underlimit and equal limit counts as well as central calculator means operative to alternatively, selectively product heating, cooling and no operation signals in accordance with said overlimit, underlimit and equal limit counts.

Other features and advantages of the present invention will become apparent from a consideration of the following detailed description when taken in conjunction with the accompanying drawings, in which:

DETAILED DESCRIPTION OF THE INVENTION

The temperature control system constructed in accordance with the present invention is operative to provide complete information and control for temperature maintenance over a wide area. This system finds particular application to a building having many occupancy units such as a large apartment house or an office building. In such applications, a plutality of thermostats are distributed at various points within a given region, such as a group of rooms, a suite or offices, or a particular floor in the building or in different buildings, all of which are to be controlled from a central location. Thus, identifiable groups of thermostats are respectively associated with corresponding regions of a building for which temperature information maintenance is desired.

Figure 1:
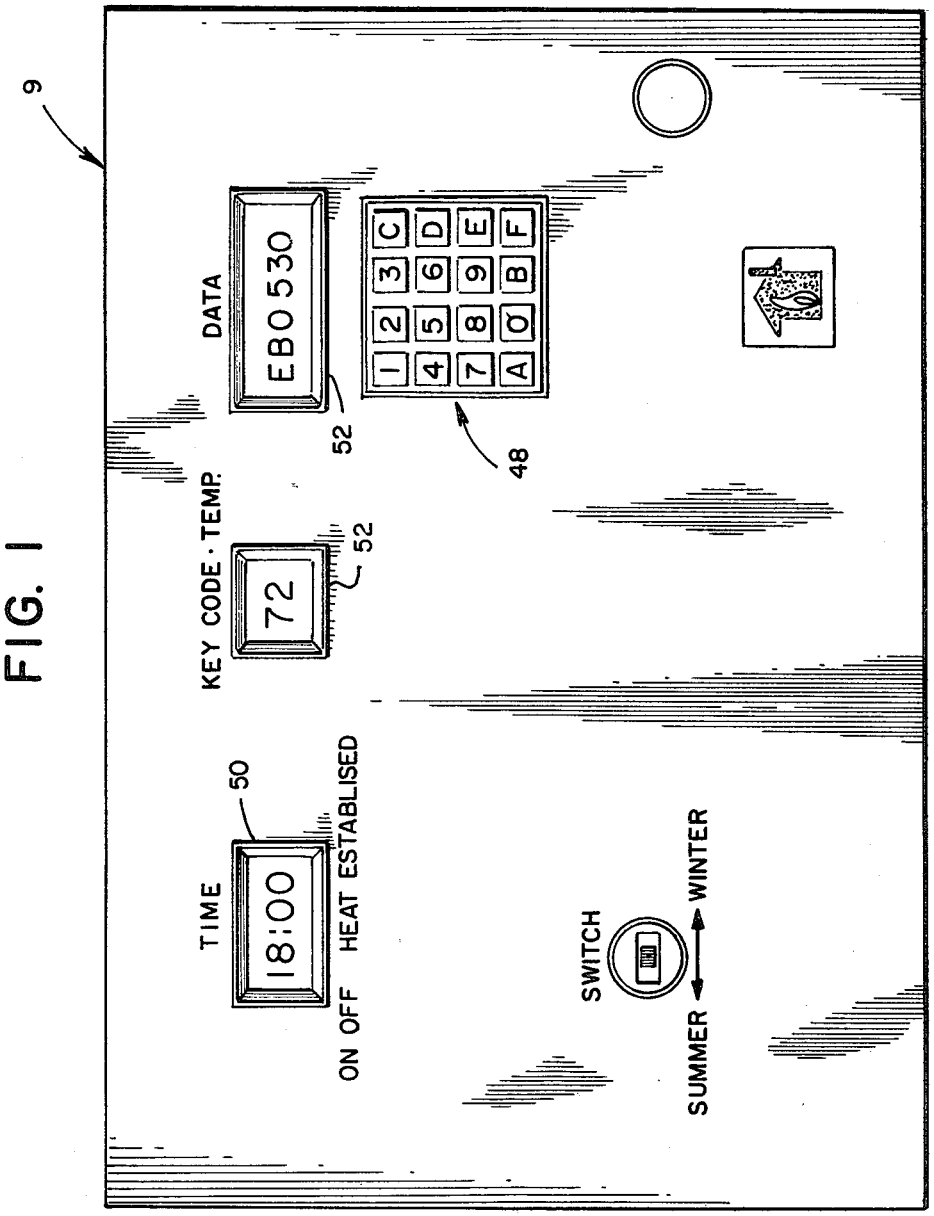
FIG. 1 is a front view of the control panel in the electronic temperature control system constructed in accordance with the present invention.

The control panel 9 shown in FIG. 1, which provides a display of pertinent temperature data and permits the operator to input various instructions to the system, may be located within the building whose temperature is to be controlled or at a location remote therefrom.

Figure 2:
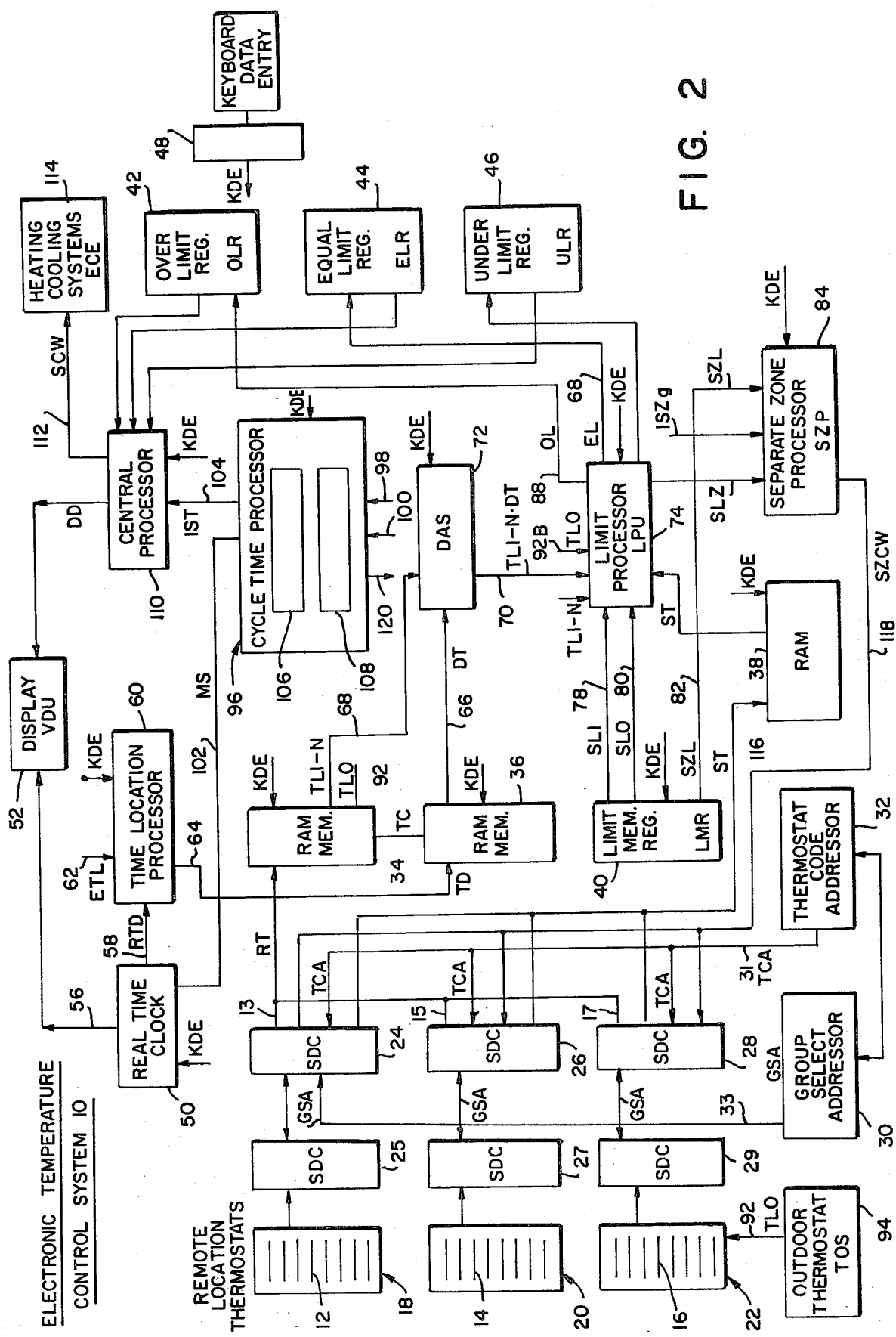
FIG. 2 is a circuit diagram in functional block form of the electronic temperature control system constructed in accordance with the present invention.

Referring now to FIG. 2, the electronic temperature control system designated by the numeral 10, is operative in conjunction with groups of thermostats distributed through-out the building. Although the system of the present invention is not limited in its operation to a particular type of thermostat, in the following description it will be assumed that the electronic thermosts referred to herein-below are of the type described in U.S. Pat. No. 3,942,718.

Although the system is not limited to a particular number of thermostat groups or number of thermostats within a group, the invention will be described with reference to three thermostat groups, A, B, and C, respectively designated by the numerals 22, 20, and 18. Each of the thermostat groups may comprise an indeterminate number of thermostats; a particular thermostat in each of groups 22, 20 and 18 being respectively designated by the numerals 16, 14 and 12 respectively.

Briefly, the system 10 includes a real time clock 50, serial data controllers (SDC) 24, 26 and 28 for polling each thermostat in each of the thermostat groups A, B, and C, a limit memory register (LMR) 40 for storing digital data corresponding to the desired ambient temperature limits at each thermostat location, a memory 34 for storing the polled temperture data, a limit processor unit (LPU) 74 for comparing the temperature data with the desired ambient temperature limit data and producing overlimit, underlimit, and equal limit counts are respectively applied to overlimit register (OLR) 42, underlimit register (ULR) 46, and equal limit register (ELR) 44. The system further includes a cental processor 110 to which the aforesaid overlimit, underlimit and equal limit counts are applied and which is operative in response thereto, to produce command signals to the appropriate heating and cooling sources 114.

By way of example, the operation of the present system will be described with respect as applied to a multi-floor office building with each floor having several offices. Assuming that the plurality of thermostats on each floor of a building form a separate thermostat group, for a building having N floors there will be N thermostat groups.

In such case, it is necessary to poll all thermostats in the building to determine the real temperature distribution therein and to make a heating or cooling decision based on such information.

Thermostats 12, 14, and 16, each represent one thermostat in their group; e.g. the thermostat located on each floor in the Southwest corner of the building. Thermostat groups 18, 20, 22, each represent the total number of thermostats on the respective floors of the building.

The thermostats are given a hexadecimal base 16 for purposes of digital data transmission and reception. These code numbers range from the decimal value 128 to 255 which correspond to 80 to-the-base 16, and FF to-the-base 16, in the hexadecimal notation. Thus, up to 127 thermostats for each of the various thermostat groups can be addressed by this seven binary digit (bit) code. It is understood, however, that if multiple addresses are assigned to a single thermostat, fewer than 127 thermostats are available for the given group.

This situation obtains for thermostats with built-in, set-in control capability and will be described below: Thermostat groups 18, 20, 22, each having up to 127 thermostats, are respectively connected for purposes of digital data transmission and reception to separate serial data controllers 24, 25, 26, 27, 28, and 29 as shown in FIG. 2. The Serial Data Controllers (SDC's), which are a standard component of digital data transmission systems, are operative to receive data in a serial sequence and to retransmit the same on an eight bit parallel data buss which is hardwired to the various thermostats. Examples of typical SDC's suitable herein are National Semiconductor 5303 or Standard Microsystems PN No. COM 2502. Since the digital data transmission here involved is asynchronous and bidirectional, a pair of UART (universal asynchronous receiver/transmitter) devices are required for each of thermostat groups 18, 20, and 22.

Group Select Addresser 30 and Thermostat Code Addresser 32, each of which comprises a binary counter with associated decoded outputs, are employed to determine the choice of group and thermostat within the group respectively. Thus Group Selector 30 selects the group code 33, while the Thermostat Code Addressor 32 selects the thermostat code 31 within the group. The order of cycling and the increment pattern which is important for the operation of the system is implemented as follows: Thermostat Code Addressor 32 increments once for each fully cycle of N groups selected by Group Select Addressor 30. Thus, Group Select Addressor 30 steps through the inner or minor cycle while the Thermostat Code Addressor 32 steps through the outer or major cycle.

For a given thermostat code 31, ranging between 80-FF in hexadecimal notation, in the Thermostat Code Addressor 32, Group Select Addressor 30 selects (in sequential order), the group code GSA 33 in the range 1-N. For each group so selected, the associated SDC transmits the thermostat code TCA 31 to the appropriate thermostat 12, 14, or 16. Group Select Addressor 30 increments and repeats this process until all N groups of thermostats have been addressed, whereupon GSA 30 resets, and SDC's 24, 26, and 28 are transferred to the receiver mode, while SDC's 25, 27 and 29 are transferred to the transmit mode.

Group Select Addressor 30 then again cycles through the N group codes 33, but for this cycle the particular SDC 24, 26 or 28 so selected receives temperature data RT 13, 15 or 17 from the thermostat in the hexadecimal range 0-7F. Since this RT data 13, 15 or 17 is in the hexadecimal range 0-7F, while the Thermostat Addressor Code TCA data 31 corresponding to thermostats 12, 14 or 16, is in the hexadecimal range of 80-FF, there can be no confusion of RT (real temperature) temperature data with the Thermostat Code Addressor data in the system. The RT temperature data is deposited in the memory 34, which is a standard random access memory (RAM) with associated clock, write, read, and addressing lines (not shown). Memory 36, Memory 38, Limit Memory Register 40, Overlimit Memory Register 42, Equal Limit Register 44, and Underlimit Register 46 are similar standard type RAM's.

After all the particular thermostats, 12, 14 and 16 labeled with said thermostat code TCA have transmitted appropriate RT temperature data 13, 15 and 17 into the respective receiving SDC 24, 26 or 28, and said data have been deposited into memory 34, these SDC's are reset into the transmit mode, and Group Select Addressor 30 is also reset. Thermostat Code Addressor 32 is incremented and the just described operational sequence is repeated for the next higher thermostat code.

The entire inner (i.e., minor cycle) is repeated for all thermostat codes in the hexadeciman range 80-FF.

Upon completion of this system, the Thermostat Code Selector 32 is also reset. The complete cycle of TCA 31 values over the range 80-FF in hexadecimal constitutes the major (i.e., outer) cycle of the system operation.

The data in the RAM memories 36 through 46 can be accessed by a Keyboard Data Entry System 48. Furthermore, Keyboard Data Entry (KDE) 48 is also used to update the real time clock 50 and to cause the memory contents to be displayed on display unit 52 for visual examination. KDE 48 comprises a keyboard 49 including coding and data lines needed to perform the above-described functions. Such KDE system is exmplified, but not limited to, National Semiconductor Type No. MM74C922.

The real time clock 50 generates two signal types. The first is the real time display signal RTDS 56 which is available for display purposes on the Visual Display Unit (VDU) 52. The second generated signal available from RTC 50 is RTD 58, namely the binary coded real time of day. This RTD 58 data is inputted to the Time Location Processor (TLP)60. TLP 60 comprises standard comparator which performs the following Boolean operation on the input values RTD 58 and the entered or pre-existing value ETL 62.

$$TD = [RTD \cdot ETL] + [RTL' \cdot ETL']$$

The value of ETL 62 is a time of day corresponding to a specific thermostat 12, 14, or 16. The value TD 64 is true if, and only if, RTD 58 is exactly equal to ETL 62. IF signal TD 64 is true it is applied to memory 36 in which the address of the given thermostat is resident, this signal also being resident in memory 34. Memory 36 further contains the digital value in the range of 0-N of the temperature differential DT66 which must be added to or subtracted from the current temperature TL1-N 68 to obtain an updated temperature TL1-N·DT.

The addition or subtraction process is performed by Differential Adder Subtractor (DAS) 72, which constitutes a standard binary adder. DAS 72 performs the following Boolean function.

$$TL1 - \dot{N} \cdot DT = [(TL1 - N \cdot DT) + (TL1 + N \cdot DT')]$$

The signals TL1·DT 68 and TLN·DT 70 are the temperatures at the thermostat location (i.e. 12, 14 or 16) which is changed by DT 66 at the time TD 64. The signals TC and DT are entered by means of KDE 48 into Memory 36. Alternatively, these values may be hardwired into the system.

If signal TD 64 is not true, then DAS 72 is not employed and the temperature TL1-N 68 is routed directly to Limit Processor Unit (LPU) 74.

Signals TL1-DT 68 and TLN-DT 70 are applied to Limit Processor Unit (LPU) 74 via line 70. Additional input to LPU 74 comes from the Limit Memory Register (LMP) 40, which is a RAM similar to Memory 34 described above. LMR 40 contains the following data: set indoor limit (SLI) 78, set outdoor limit (SLO) 80, and a Separate Zone Limit (SZL) 82. The SZL 82 data is not used for the LPU 74, but is used in the Separate Zone Processor (SZP) 84 which is described below.

The LPU 74 which is an equality tester, such as Fairchild Type Nos. 340085 or 7485 performs three functions: A less than B, A equal to B, and A greater than B. A and B are generic terms for any of the input data to LPU 24, such as TL1-N, TLO, SLO, SLI or ST. LPU 74 performs the following Boolean functions:

$$EL = [\overline{TL1 - N} + \overline{TL1 \cdot N} + TL1 - N \cdot DT + TL1 - N \cdot \overline{DT}] = \overline{SL1} + \overline{SLI}$$

This Boolean function compares either TL1-N 68 or TL1-N·DT 70 to the value of Set Limit Indoors (SLI) 78. If the thermostat-related value 68 or 70 is equal to the value of SLI 78, Equal Limit Register 44 is incremented. If the thermostat related value TL1-N 68 or TL1-N DT is greater than the value of SLI 78, Over Limit Register (ULR) 46 is incremented. The signals to increment registers OLR 42, ELR 44 and ULR 46 are set along data lines 88, 86 and 90, respectively.

This signal processing sequence is repeated until the following steps are completed: all thermostats in all groups have been polled, have had a differential added thereto or subtracted therefrom as the case may be, the subsequent temperature information compared to the proper limits, and the comparison results recorded in the appropriate register.

Memory 34 also contains the temperature TLO 92 data obtained from an external thermostat TOS 94 located outside the building whose temperature is being controlled. LMR 40 contains the outdoor limit SLO 80. Signals 80 and 92 are used by the Cycle Time Processor (CTR) 96 to increment or decrement the On-Time (OT) 98 and Off-Time (OF) 100 signals which are entered into CTP 96 by means of KDE 48. CTP 96 has logic elements capable of performing an equality test between the minutes units 100 of RTC clock 50 and either the On-Time value 98 or the Off-Time value 100. It should be noted that the MS 102 is a subset of the entire RTC 50 output. CTP 96 contains logic elements which satisfy the Boolean function describing a flip-flop device. The operation so described is:

$$Y^{\nu+1} = S^{\nu} + Y^{\nu}\overline{C^{\nu}}$$

where $Y^{\nu}$ is the output for the arbitrary time $t_{\nu}$.

This function generates an output signal referred to as the Interrupt System Code 104, which is neither a logical "0" or a logical "1" value the latter indicating that an Interrupt will be generated if an MS 102 signal equals the On-Time 98 signal. A logical "0" value for IST 104 indicates that no Interrupt is generated and that MS 102 equals Off-Time 100.

The practical implementation of this comparison is for the MS signal 102 to increment counter 106. When the value of counter 106 is compared to the value of OT 98, flip-flop 108 will change state and reset counter 106 to the value of logical "0", and then compare the MS value 102 to the value of 100.

Interrupt Time Signal 104 which is operative to interrupt the SCW control signal 112 at the selected intervals, viz OT 98 and OF 100 is applied to Central Processor 110 which includes a storage register, a comparator and means for driving the External Control Elements (ECE) 114, which may comprise a solid state relay or valve. Central Processor calculator 110 also maintains in its memory register values corresponding to OLS which is the number of thermostats which must be over limit, ULS data, which corresponds to the number of thermostats which must be under limit, and ELS data which corresponds to the number of thermostats which must be at the limit. The OLS, ELS, and ULS data are entered into Central Processor 110 via KDE 48. Information regarding the actual distribution of thermostats is available from OLR 42, ELR 44 and ULR 46 data.

These values may be set in KDE 48 at any desired proportion, but the total value should not exceed the total number of thermostats in the system.

By way of example, let the total number of thermostats be 50 and the value OLS entered by the operator also be 50. When the value of OL in OLR 42 equals 50, a signal SCW 112 will be sent to ECE 114, which would be the case for a cooling control signal. In the heating case, the CPU 110 would compare the values ULS stored in its own memory with the value UL obtained from the ULR 46 data. The values for OLS, ELS, and ULS are not static but can be varied at any time by input from KDE 48.

Furthermore, the data in CPU 110 may be displayed on VDU 52 to show the current limit values OLS, ULS and ELS. The values of OLR 42, ULR 44, and ELR 46, may thus be respectively displayed on VDU 52.

System 10 has a special mode of operation for those thermostats which are directly connected to a heating or cooling system, which is now described. If a remote thermostat 12, 14, or 16 has its own associated heating or cooling system which is controlled, then LPU 74, the Separate Zone Processor (SZP) 84, and Memory 38 are employed for data processing. If the thermostat in question has its own set or control capability, then several addresses (of the 127 available in any group 18–22) must be assigned to the thermostat, with resulting decrement of the total number of thermostats available in said group. In such a situation, the thermostat with remote set capability is polled twice; once for the set temperature 116 and once for the actual temperature 13, 15 or 17, as the case may be; the set temperature being stored in Memory 38. The set temperature (ST) 116 is compared to the actual temperature 13, 15 or 17, plus or minus the differential DT 66. Also, the set temperature 116 is compared to a Separate Zone Limit (SZL) 82. If the ST 116 is outside the Separate Zone Limit 82, then the Separate Zone Processor 84 assigns a maximum set temperature, where the limit is entered by KDE 48. SZP 84 then compares this temperature to the actual temperature RT 13, 15, or 17, plus or minus the differential. If the results of this comparison indicate that a heating or cooling action should be taken, then Separate Zone Conrol Word (SZCW) 118 is relayed to the appropriate SDC 24, 26, or 28, which will, in turn, transmit the control data to the appropriate thermostat 12, 14 or 16.

Furthermore, CTP 96 has the ability to select, on a chronological basis, a group of separate zone thermostats and cycle through said group in a manner similar to that of the single heating/cooling thermostats. When in this mode, CTP 96 issues a Separate Zone Interrupt Command 120 to the Separate Zone Procesor 84.

It is noted that while various data lines are shown as serial data lines, parallel lines may be substituted therefor, such as the lines carrying the SLI 78, SLO 80 and SCL 82, signals, for example.

It is further understood that although the temperature control system of the present invention has been described with respect to its application for controlling ambient temperature in the various rooms and floors of a building, this system is similarly operative to control the temperatures of hot water supplied to the various rooms of a building.

Although the invention has been described with respect to a particular embodiment thereof, it is to be understood that such embodiment is merely illustrative of the application of the principles of the invention. Numerous modifications may be made therein and other arrangements may be devised without departing from the spirit and scope of the invention.

What is claimed is:

1. A temperature control system for controlling the ambient temperature at a plurality of locations, respectively, each of which locations is provided with a thermostat, comprising:
   (a) data entry means;
   (b) means for polling each of said thermostats to determine the temperature at each said location at a preselected point in real time and to thereby produce polled temperature data;
   (c) first memory storage means for storing digital data corresponding to the desired temperature limits for said locations;
   (d) second memory storage means for storing said polled temperature data;
   (e) first comparator means for comparing said polled temperature data which said desired temperature limits data and operative to selectively produce over-limit, under-limit and equal limit occurs corresponding to the difference between said polled temperature data and said desired temperature limits data;
   (f) third memory storage means for storing said overlimit, underlimit and equal limit counts;
   (g) central calculator means operative to alternately, selectively produce temperature changing, and no operation command signals in accordance with said overlimit, underlimit and equal limit counts, and
   (h) means for applying said temperature changing signals to a temperature changing source.

2. A temperature control system as in claim 1, including real time clock means for providing time of day information.

3. A temperature control system as in claim 1, wherein said central calculator means is further operative to selectively produce heating and cooling command signals and no operation command signals in accordance with said overlimit, underlimit and equal limit counts, and means for applying said heating and cooling command signals to a heating or cooling source, respectively.

4. A temperature control system as in claim 2, including second comparator means for selectively disabling said central calculator means in accordance with said time of day information.

5. A temperature control system as in claim 1, including separate zone processing means for controlling selected temperature changing sources directly associated with selected thermostats, said separate zone processing means being operative to poll said selected thermostats and to cause said selected thermostats to selectively produce temperature changing and no operation command signals, and means for applying said command signals to directly associated temperature changing sources.

6. A temperature control system as in claim 1, including separate zone processing means for controlling selected heating and cooling sources, respectively, directly associated with selected thermostats, said separate zone processing means being operative to poll said selected thermostats and to cause said selected thermostats to respectively produce heating, cooling and no operation command signals, and means for applying said command signals to said directly associated heating or cooling sources, respectively.

7. A temperature control system as in claim 1, wherein said pooling means comprises serial data controllers for addressing each of said thermostats in a preselected order, thermostat group select addresser means for selecting one of said serial data controllers corresponding to one thermostat group, and individual thermostat addresser means for selecting one of said theromstats in said one thermostat group, said one serial data controller being operative to produce an address corresponding to said one thermostat and to read the temperature recorded thereby and to feed said recorded temperature to said second memory storage means.

8. A temperature control system as in claim 1, wherein said data entry means comprises keyboard means.

9. A temperature control system as in claim 8, wherein said central calculator means is operative to compare the distribution of said overlimit, underlimit and equal limit counts with a pre-entered distribution provided by said keyboard means and to selectively produce heating and no operation signals in response thereto.

10. A temperature control system as in claim 8, wherein said central calculator means is operative to compare the distribution of said overlimit, underlimit and equal limit counts with a pre-entered distribution provided by said keyboard means and to selectively produce cooling and no operation signals in response thereto.

11. A temperature control system as in claim 2 including time location processor means operative to receive said polled temperature data and said time of day information and in response thereto to produce time adjusted temperature data.

12. A temperature control system as in claim 11, wherein said first comparator means comprises limit processor means for comparing said desired temperature limits data with said time adjusted temperature data and in response thereto to produce overlimit, underlimit and equal limit counts.

13. A temperature control system as in claim 2, including display means for displaying said time of day information, said polled temperature data, said desired temperature limits data and said overlimit, underlimit and equal limit counts.

14. A temperature control system as in claim 5, wherein said second comparator means comprises cycle time processor means operative in response to said time of day information and on and off time data pre-entered in said keyboard means to produce a disabling signal for selectively disabling said central calculator means and said separate zone processor means.

15. A temperature control system as in claim 14 wherein said cycle time processor comprises flip-flop means and counter means, said time of day information including minutes information applied to said counter and said flip-flop means being operative to reset said counter means to zero.

* * * * *